United States Patent
Hughes et al.

(10) Patent No.: US 7,366,168 B2
(45) Date of Patent: Apr. 29, 2008

(54) TCP CONTROL PACKET DIFFERENTIAL SERVICE

(75) Inventors: Mark A Hughes, Dublin (IE); Daniel M O'Keeffe, Ballyhooly (IE); Kevin Loughran, Castleblayney (IE); Joseph N Butler, Galway (IE)

(73) Assignee: 3Com Corporation, Marlborough, MA (US)

( * ) Notice: Subject to any disclaimer, the term of this patent is extended or adjusted under 35 U.S.C. 154(b) by 678 days.

(21) Appl. No.: 09/824,241

(22) Filed: Apr. 3, 2001

(65) Prior Publication Data
US 2002/0064128 A1  May 30, 2002

(30) Foreign Application Priority Data
Nov. 24, 2000   (GB) ................... 0028659.1

(51) Int. Cl.
*H04L 12/56* (2006.01)
(52) U.S. Cl. .................... 370/389
(58) Field of Classification Search ........... 370/230.1, 370/231, 235, 236, 252, 389, 392, 466, 469
See application file for complete search history.

(56) References Cited

U.S. PATENT DOCUMENTS

| | | | | |
|---|---|---|---|---|
| 5,699,521 A | * | 12/1997 | Iizuka et al. ............... | 370/455 |
| 5,987,022 A | * | 11/1999 | Geiger et al. ............... | 370/349 |
| 6,304,578 B1 | * | 10/2001 | Fluss ....................... | 370/413 |
| 6,553,031 B1 | * | 4/2003 | Nakamura et al. .......... | 370/392 |
| 6,643,256 B1 | * | 11/2003 | Shimojo et al. ............ | 370/229 |
| 2002/0027924 A1 | * | 3/2002 | Fukushima et al. ......... | 370/401 |
| 2003/0005143 A1 | * | 1/2003 | Elzur et al. ................. | 709/232 |

FOREIGN PATENT DOCUMENTS

| | | |
|---|---|---|
| JP | 2000-138686 | 5/2000 |
| JP | 2001-94605 | 4/2001 |

* cited by examiner

*Primary Examiner*—Anh-Vu H. Ly

(57) ABSTRACT

A method and switch for controlling the allocation of priority of TCP packets, more particularly for distinguishing between data and control packets and assigning an increased priority to control packets. The layer 4 information in the form of the flag bits of the header are snooped in the switch to determine whether any flag other than PSH is set and if so to allocate a priority to that packet, which will usually be a higher priority than data packets.

2 Claims, 5 Drawing Sheets

TCP CONTROL PACKET DIFFERENTIAL SERVICE

FIELD OF THE INVENTION

This invention relates to packet-based data communication networks utilising Transport Control Protocol (TCP), and more particularly to allocation of different priority to TCP control and data packets.

BACKGROUND TO THE INVENTION

TCP control and data packets are differentiated by the settings of flag bits within the TCP header. These flags can do many things such as set up a TCP conversation, tear down a TCP conversation and acknowledge that data has been received between client and server.

One of the flags, the PSH flag, is a notification from the sender to the receiver for the receiver to pass all of the data that it has received to the receiving process. The setting of the PSH flag and this notification, within the context of the present specification, defines the packet as a data packet. If any of the flag bits other than the PSH bit is set, the packet is referred to as a control packet (because it will be doing something other than passing all data to the receiving process).

The majority of the packets in a communication are data packets, but they are dependent, for example on the request and acknowledge packets that are used to request data and, once the data is received, acknowledge receipt of the data. If the acknowledge packet is not received, then it is unknown whether or not the data has been received and the data is retransmitted.

From time to time it happens that data has actually been received and it is only the acknowledge packet that has been dropped. The times when this is most likely to happen often coincide with network congestion, when retransmission of such acknowledge dependent data packets adds to further congestion. Dropping other control codes may also have similar effect of a small drop out requiring a substantially larger retransmission.

SUMMARY OF THE INVENTION

According to the invention there is provided a method of controlling an allocation of priority to TCP packets within a switch, comprising the steps of a) determining whether the packet is a control packet; b) assigning priority to control packets that is different to the priority of the data packets that they control.

The invention also provides a switch including logic for snooping TCP header packets and establishing whether the packet is a control packet and means for assigning a priority to the packet dependent on whether it is a control packet.

More particularly the present invention is directed towards minimizing the likelihood of TCP control packets not reaching their destination by allocating a higher quality of service rating to the control packets, leaving the data packets classed independently at their usual service level. The TCP control packets are identified by snooping the Layer 4 information within the packets, and if a packet is a control packet, assigning a higher quality of service rating, such as high assured forwarding rating.

Assigning this higher class of service means that at times of network congestion, when web caching may be employed, the control packet has a higher chance of being received and thus there is a reduction in utilisation of bandwidth by retransmission of dependent data packets.

It also provides a more reliable service for TCP control packets that can be used as management packets in other parts of the network.

DETAILED DESCRIPTION OF A PREFERRED EXAMPLE

Figure 1:
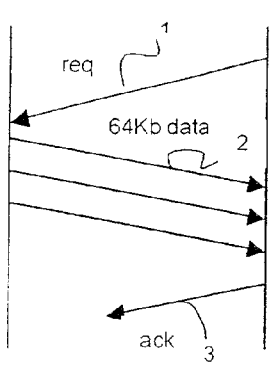
FIG. 1 is a schematic diagram illustrating a failed transmission resulting from loss of an acknowledge signal.

FIG. 1 of the drawings illustrates in a simplified form a transmission between a client and server. In this schematic diagram the client issues a request 1, the server sends data 2 in response and the client then sends acknowledge 3, but the acknowledge signal is dropped.

In consequence, the whole procedure requires retransmission. If the acknowledge signal is given a higher priority, this circumstance is less likely to occur and retransmissions are more constrained to circumstances of dropped data packets.

Figure 2:
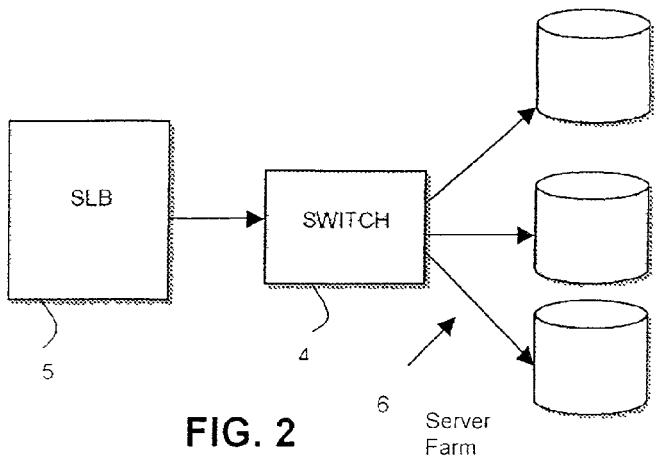
FIG. 2 is a schematic diagram of a server load balancer, switch and server farm in which TCP control packets are used for management purposes.

FIG. 2 schematically illustrates an advanced Server Load Balancing (SLB) device 5, high speed switch 4 and server farm 6. In this system the SLB device will set up and tear down sessions using the TCP control traffic. This means that the TCP control traffic is no longer solely being used by the client and server, it can now be classed as management traffic. This use of TCP control packets means that the system would benefit from them being assigned a higher priority of service.

In the invention it is proposed to assign different priorities to the control packets within classification logic. This can be achieved within high speed switches by snooping the layer 4 information within the packet, as explained in more detail with reference to FIGS. 3, 4, 5, 6, 7 and 8.

Figure 3:
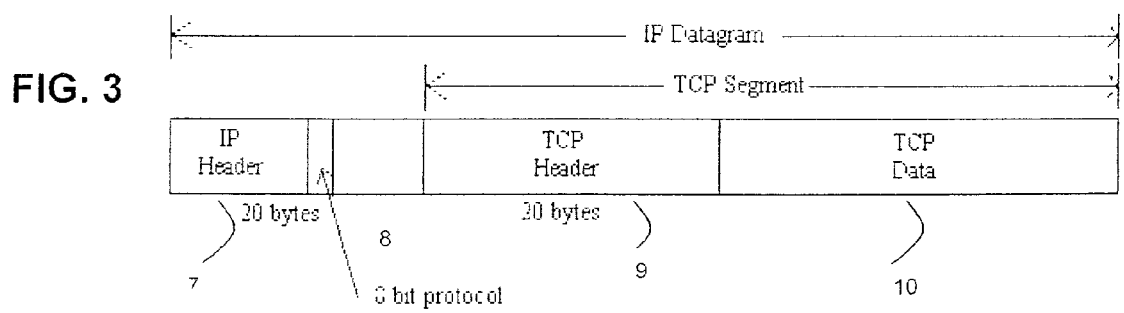
FIG. 3 is a schematic diagram of an internet protocol datagram.

As shown in FIG. 3, a datagram commences with an IP header 7, within which is an 8 bit protocol segment 8 which identifies if the next protocol encapsulated in the packet is TCP or some other protocol. It is assumed in FIG. 3 that a TCP Header 9 and TCP data 10 follow.

Figure 4:
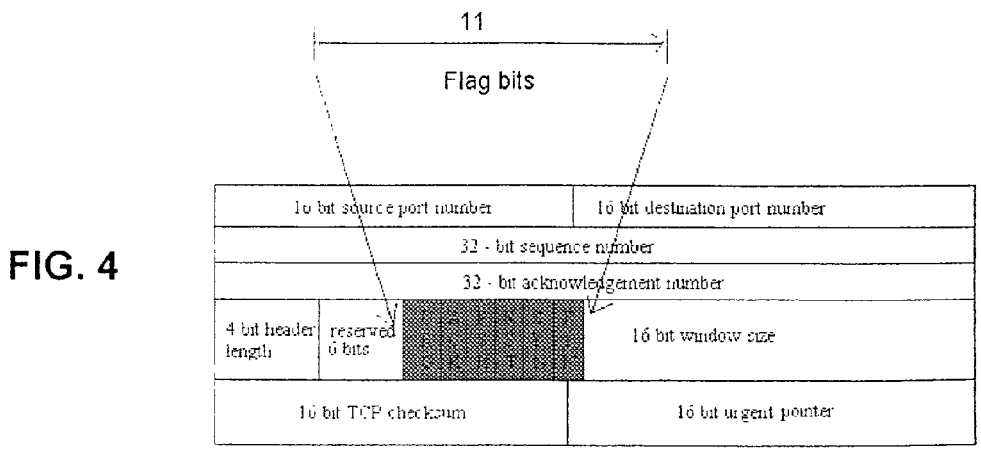
FIG. 4 is a schematic diagram of a TCP header.

Once it is established that the next protocol is TCP, the TCP control flags are examined by the switch. FIG. 4 shows in more detail the TCP Header which includes TCP flag bits 11, individually labelled URG, ACK, PSH, RST, SYN and FIN. The switch decodes the packet encapsulation to determine whether the packet is a control type packet by checking if any of the flag bits other than the PSH flag bit are set. When any flag other than PSH is set that packet is assigned a higher priority within the switch by the logic that assigns the DSCP (Differential Services Control Point) to that packet. In this way TCP packets are given an alternative priority to the data packets that they control within a TCP/IP session. An example of where this may be implemented is described in relation to FIG. 5.

Figure 5:
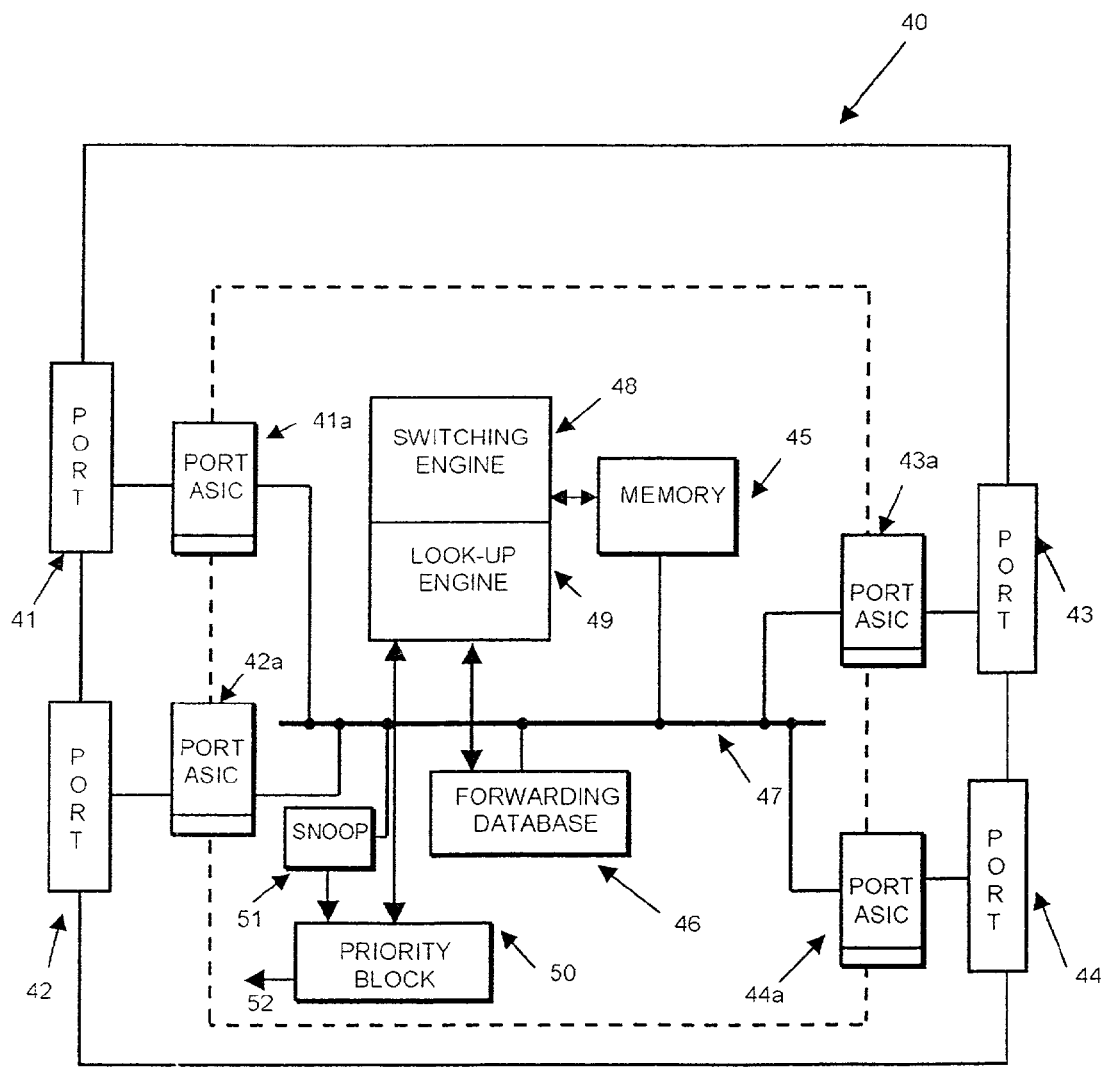
FIG. 5 is a generally conventional diagram of a switch within which the invention may be implemented.

FIG. 5 illustrates for the sake of example a typical switch 40 within which the invention may be performed. A switch may generally be regarded as a network unit having a multiplicity of ports for the reception and forwarding of data packets and a forwarding engine which responds to address data in the packets to determine which of the ports are selected for forwarding the packets. A core switch commonly has a significantly larger multiplicity of ports than shown in FIG. 5, which for the sake of simplicity is illustrated with only four ports 41, 42, 43 and 44. Each of these is associated with a respective port ASIC 41a to 44a respectively. The port ASICs each have some means of applying priority to traffic passing through the switch. The switch includes a memory 45 for the temporary storage of packets between the time they are received and are forwarded to their respective port or ports. The forwarding of packets is controlled by means of a forwarding database 46 (relating destination addresses with specific port numbers). The forwarding database is accessed by means of a look-up engine 49 which operates in conjunction with a switching engine 48 to retrieve packets from memory 45 and to direct them to their respective locations. The allocation of priority to switches is shown schematically by a priority block 50. The snooping of packets between the port ASIC and memory 45 is shown by the snoop block 51 and the control of the ASICs by means of priority block 50 is shown by arrow 52. Bus 47 represents the buses required for the conveyance of control and management signals as well as packet data across the switch.

Figure 6:
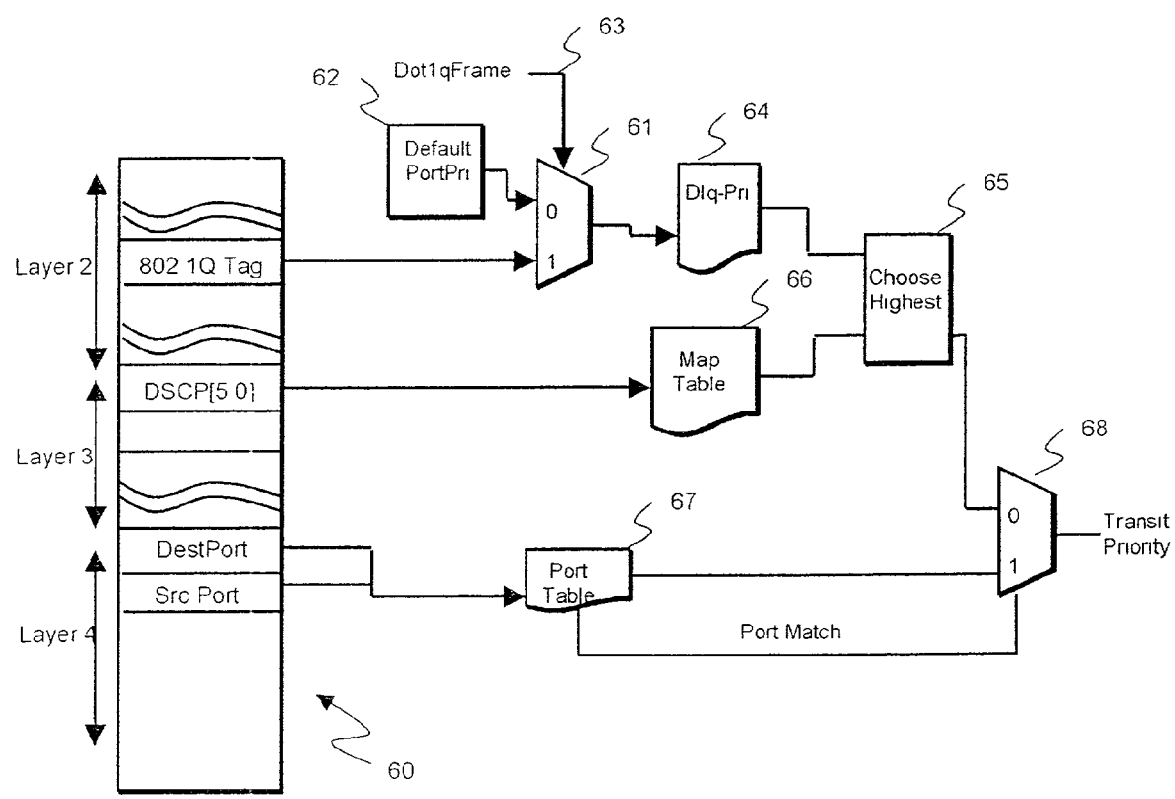
FIG. 6 is a diagram illustrating the determination of a transit priority in a switch.

FIG. 6 illustrates how a packet passing through a switch is allocated a transit priority which it carries through the system. Such a transit priority is used (as is well known in itself) to determine the priority of transmission of packets from the switch or from individual ports by means of transmit queues which are allocated different priorities and which can be selected in accordance with the transit priority. The internal transit priority can be mapped to a priority field, specifically a 802.1q field for an Ethernet packet, if the packet is to be sent out on a link which is configured for the transmission of packets containing a priority tag field or to a DSCP code point if the network supports differentiated services FIG. 6 illustrates in particular how the priority of a packet is determined having regard to various priority values associated with different fields in the header of the packet and other indications of priority such as the flag bits in the TCP header.

In FIG. 6 the numeral 60 denotes in simplified form part of an Ethernet packet and particularly part of the header of it. Typically an Ethernet packet contains 'layer 2' information constituted by destination address data (which may be a single destination MAC address in the case of a unicast packet or a group address in the case of a multicast packet), a source MAC address and, in this example, an 802.1q tag which defines a priority for the packet in terms of a 3-bit field, the value corresponding to zero representing the lowest priority. The packet 60 also contains 'layer 3' or 'IP' data which may comprise an IP or network destination address and source address and which, in this example, contains a network priority field known as a DSCP (Differential Services Code Point) field conventionally consisting of a 6-bit field. Further, the packet contains higher layer information, particularly in this example 'layer 4' information in the form of UDP/TCP destination and source port numbers, shown in packet 60 by the legends 'DestPort' and 'Src Port' respectively. This prioritization scheme also uses the flag bits which are contained within the layer 4 header.

Furthermore, the port on which the packet is received may have a priority allotted to it.

In the present example, a multiplexer 61 receives at one input a priority value which represents the default priority 62 of the port on which the packet was received. The packet is 'parsed' that is to say routinely examined to determine whether it has an 802.1q tag, and, if the packet has such a tag, a relevant signal is asserted on a select line 63 to allow multiplexer 61 to select the priority determined in the 802.1q tag field instead of the default priority associated with the receiving port. The priority value obtained at the output of multiplexer 61 is converted by a mapping table 64 to an internal priority. This priority is hierarchical so that the greater the number the higher the priority. If the table receives at its input a value which is not applicable, for example from an non-IP frame, then it sets an internal priority at the lowest value (zero).

A decision circuit 65 is arranged to choose the higher priority obtained from the mapping table 64 and a further mapping table 66 which converts the DSCP value to a 3-bit internal priority. The mapping table 66 will use the flag bits to determine if a low priority packet can be upgraded in priority. This will occur if the packet is designated to be a TCP control packet. The value selected by decision circuit 65 will become the transmit priority unless an examination of layer 4 (or higher layer) source and destination address yields a match as about to be described.

The values 'DestPort' and 'SrcPort' obtained from the 'layer 4' fields in packet 60 are coupled to a port table 67 which has the effect of an associative store indexed on the (16-bit) port number. If the port is found in the table then the result is a 3-bit priority value which will also use the flag bits to evaluate the mapping. This port priority will override the priority value obtained from the 'media access control' and protocol priorities. Thus if there is a match in the port table a multiplexer 68, which has a default setting to choose the output of decision circuit 65 is controlled to select the priority value obtained from the port table 67. The result at the output of multiplexer 68 is a 'transit' priority which is always a 3-bit number. The advantage of this is that it allows a simple re-mapping to an appropriate 802.1q field on a packet output from the switch.

Figure 7:
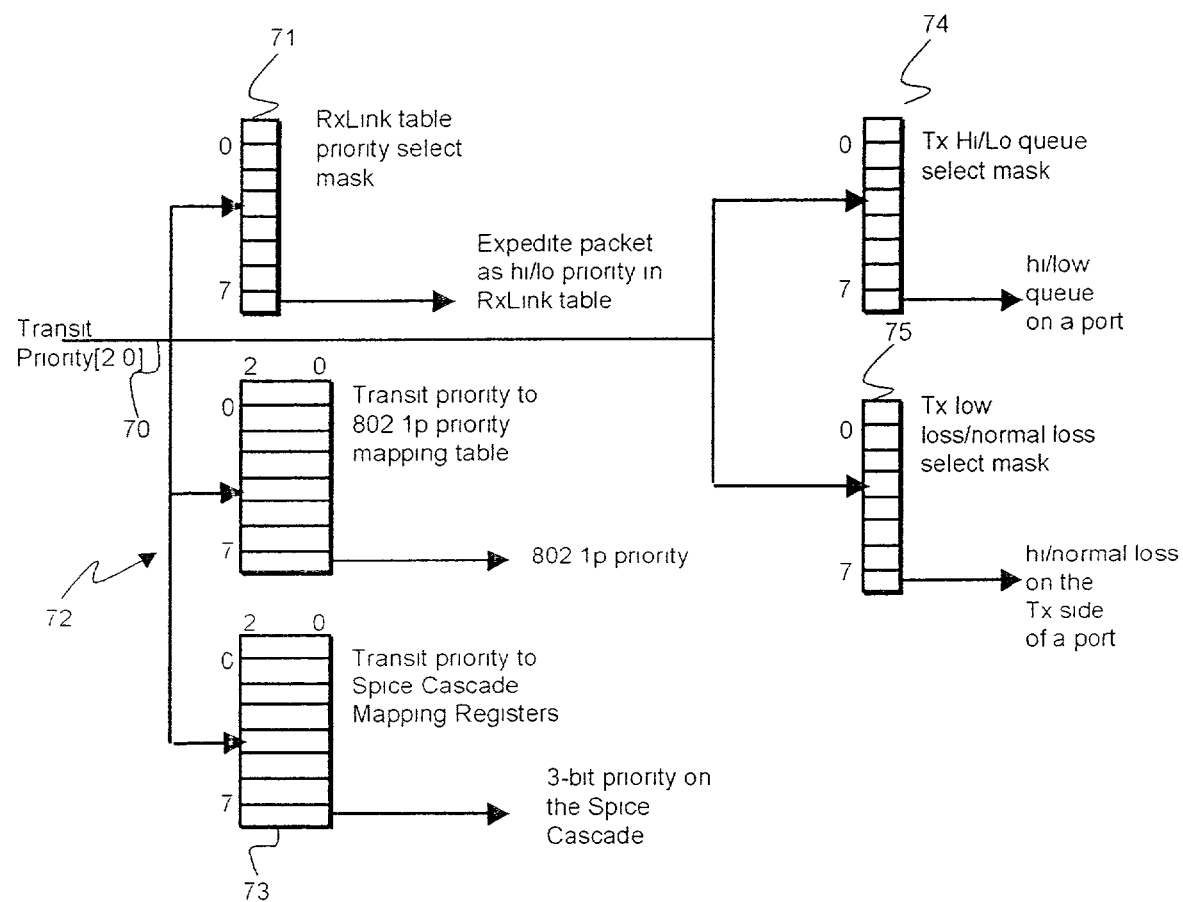
FIG. 7 is another diagram illustrating the use of the transit priority.

FIG. 7 shows how a transit priority may typically be used in a switch. The transit priority value appears on a line 70 and is coupled to a multiplicity of registers (71 to 75) These define various bit masks and are accessed by the transit priority. Register 71 is the Rx link table priority select mask which provides priority for extracting packets from a receive queue. Register 74 is a mapping of a transit priority to an 802.1p priority mapping table. Register 73 provides priority on a 'cascade'. Register 74 provides a mask for a transmit queue and register 75 provides a Tx low loss/normal loss select mask.

Figure 8:
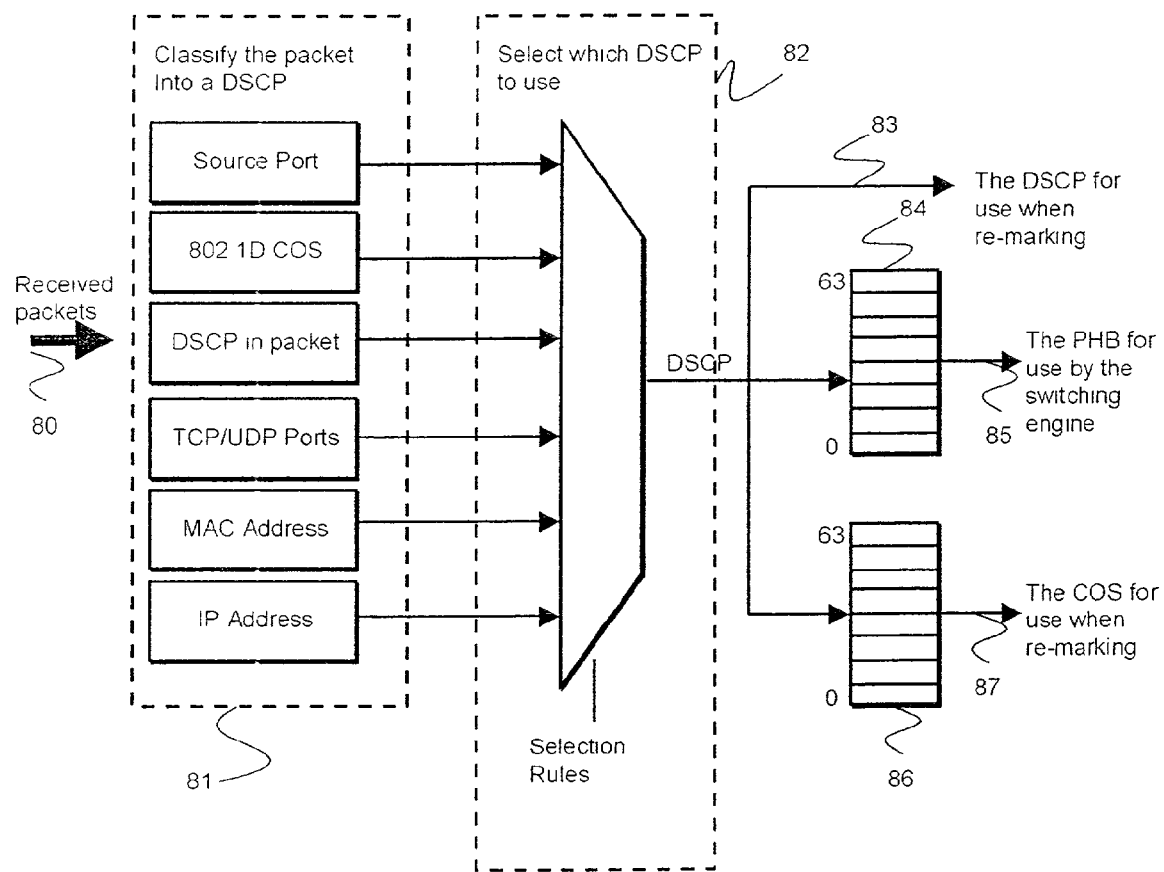
FIG. 8 is a diagram of a 'quality of service' classification.

TCP/UDP port number matching may also be used for quality of service support, as shown in FIG. 8. Received packets 80 may be parsed to make available various data relating to the packet, particularly the source port, the 802.1d COS (Conditions of Service), the DSCP, the TCP/UDP ports, the MAC address the IP address and the TCP flag bits. Which of the relevant data is selected depends upon selection rules as shown by block 82. The DSCP priority may be fed out on line 83 or connected to registers to provide the PHB (Per Hop Behaviour) for use by the switching engine or the COS value for use hie re-marking.

There are therefore a variety of schemes for controlling priority within a switch from the transit priority.

It will be appreciated that TCP control packets are only a small percentage of the total packets and that increasing priority in this ay has minimal effect on congestion of the higher priority rate, which is more than compensated by the reduction in retransmission at the lower priority rate.

The invention claimed is:

1. A method of controlling an allocation of packet transmission priority to transport control protocol (TCP) packets within a switch to transmit the packets thereover, said method comprising:
   a) determining whether a packet passing through said switch to be transmitted is a TCP control packet by checking flag bits within a TCP header of the packet and establishing if any flag other than a PSH flag bit is set;
   b) assigning by the switch, within the packet, a packet transmission priority to such determined TCP control packets that is different to the priority of TCP data packets that such TCP control packets control, wherein an increased priority of packet transmission, relative to other packets having a PSH flag bit set, is assigned to the packet if a flag bit other than the PSH flag bit is set.

2. A switch for the reception and transmission of Transport Control Protocol (TCP) packets passing through said switch including both control packets and non-control packets each having a header conforming to the Transport Control Protocol (TCP), said switch including:

amultiplicity of ports for receiving and transmitting said TCP packets passing through said switch;

means for allocating a packet transmission priority to TCP packets within said switch as they are being transmitted;

means for checking flag bits within the header of each of said TCP packets to determine whether a given TCP packet is a TCP control packet, said means for checking including logic for snooping the header of each of said TCP packets to establish whether any flag in said header other than a PSH flag bit is set; and means for assigning, within the packet, a packet transmission priority to said given TCP packet passing through said switch dependent on whether it is a TCP control packet, wherein an increased packet transmission priority is allocated to TCP packets, relative to other packets having a PSH flag bit set, having a set flag bit other than said PSH flag bit.

* * * * *